US009838066B2

United States Patent
Larson et al.

(10) Patent No.: US 9,838,066 B2
(45) Date of Patent: Dec. 5, 2017

(54) EMBEDDED WIRELESS MODEM

(71) Applicant: NimbeLink Corp., Plymouth, MN (US)

(72) Inventors: Kurt T. Larson, Plymouth, MN (US); Christopher J. Elmquist, Mahtomedi, MN (US)

(73) Assignee: NimbeLink Corp., Plymouth, MN (US)

( * ) Notice: Subject to any disclaimer, the term of this patent is extended or adjusted under 35 U.S.C. 154(b) by 0 days.

(21) Appl. No.: 15/350,205

(22) Filed: Nov. 14, 2016

(65) Prior Publication Data

US 2017/0141809 A1 May 18, 2017

Related U.S. Application Data

(63) Continuation of application No. 14/616,118, filed on Feb. 6, 2015, now Pat. No. 9,497,570.

(60) Provisional application No. 61/936,651, filed on Feb. 6, 2014.

(51) Int. Cl.
*H04B 1/40* (2015.01)
*H04W 4/00* (2009.01)
*H04M 1/02* (2006.01)

(52) U.S. Cl.
CPC ............ *H04B 1/40* (2013.01); *H04M 1/0277* (2013.01); *H04W 4/005* (2013.01)

(58) Field of Classification Search
CPC ....... H04B 1/40; H04W 4/005; H04M 1/0277
See application file for complete search history.

(56) References Cited

U.S. PATENT DOCUMENTS 9,497,570 B2 * 11/2016 Larson ................. H04W 4/005
2008/0160931 A1 * 7/2008 Rofougaran ........... H01L 23/66
455/90.3

* cited by examiner

*Primary Examiner* — Lewis West
(74) *Attorney, Agent, or Firm* — Christensen, Fonder, Dardi & Herbert PLLC

(57) ABSTRACT

A space-efficient cellular modem device for machine-to-machine communications that includes: a multi-layer printed circuit board defining a top side and a bottom side and including a first circuit layer adjacent the top side, a second circuit layer adjacent the bottom side, a ground plane layer, and a power plane layer, the ground and power plane layers located between the first and second circuit layers; a cellular transceiver module configured to communicate over a cellular wireless cellular network; electrical power-management components attached to the multi-layer printed circuit board, the power-management components in electrical communication with the cellular transceiver module; first and second rows of pins in electrical communication with the cellular transceiver; and a communications port.

29 Claims, 21 Drawing Sheets

4 LAYER STACK-UP

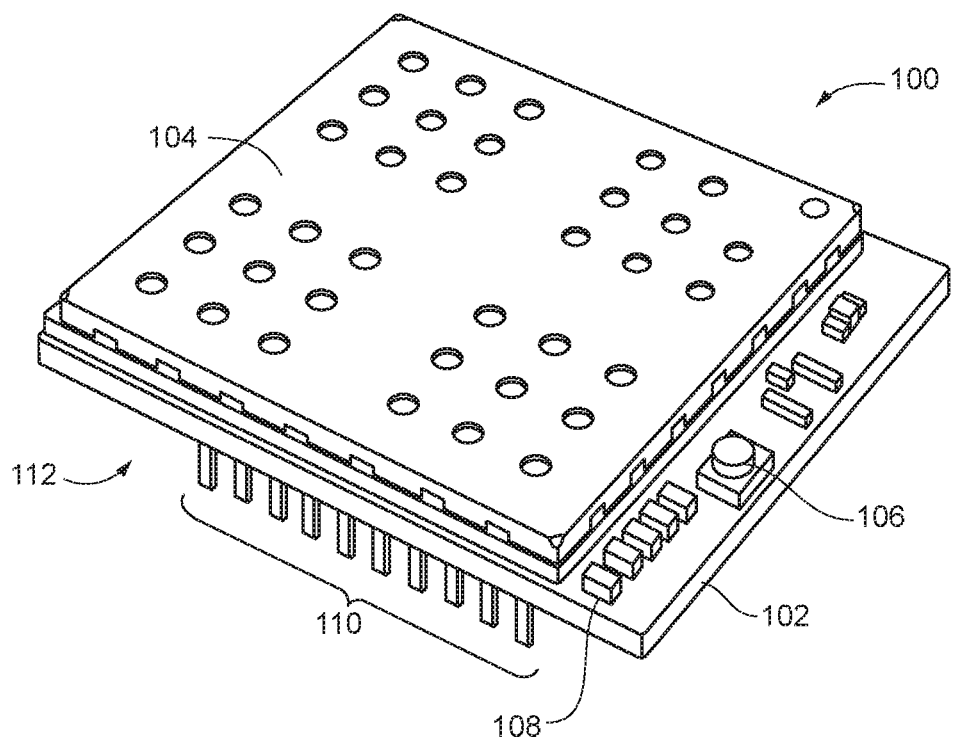

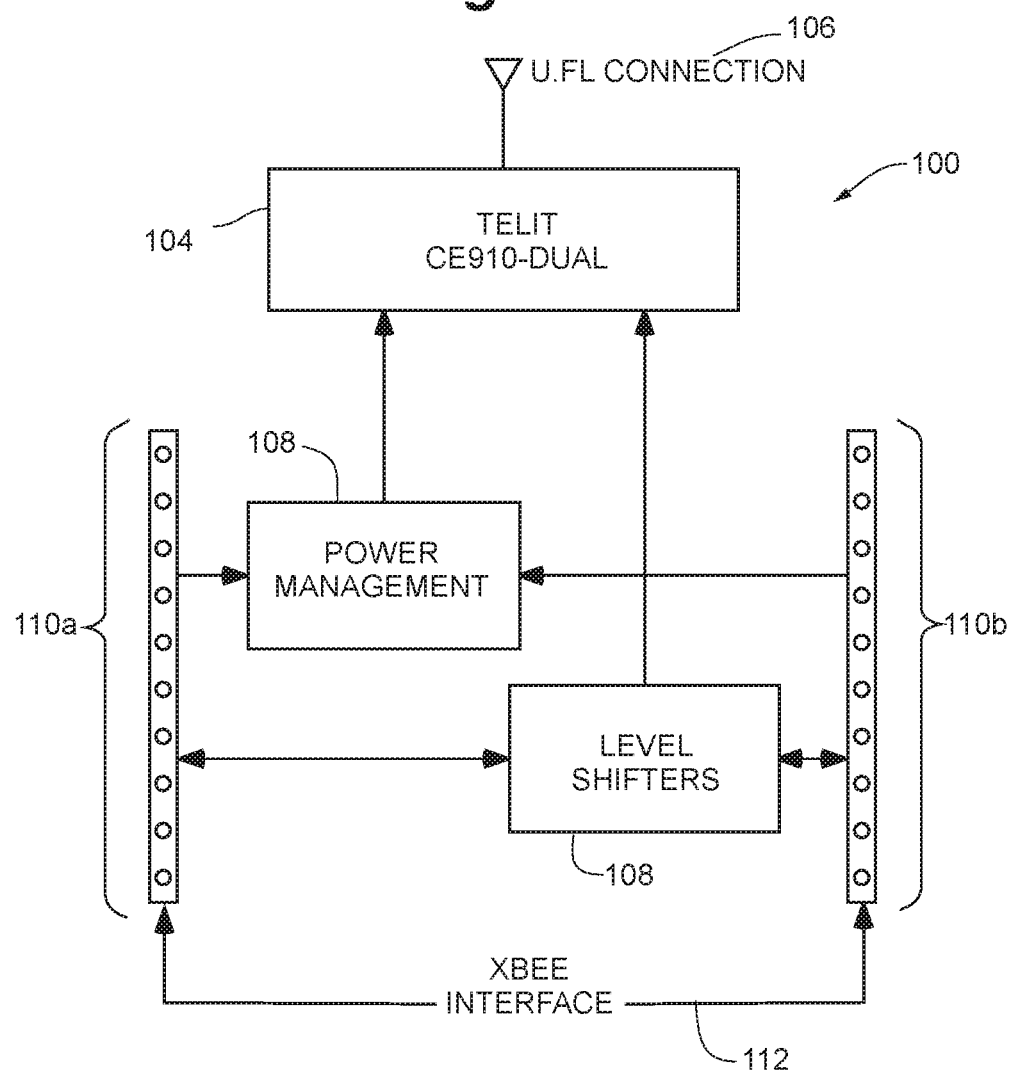

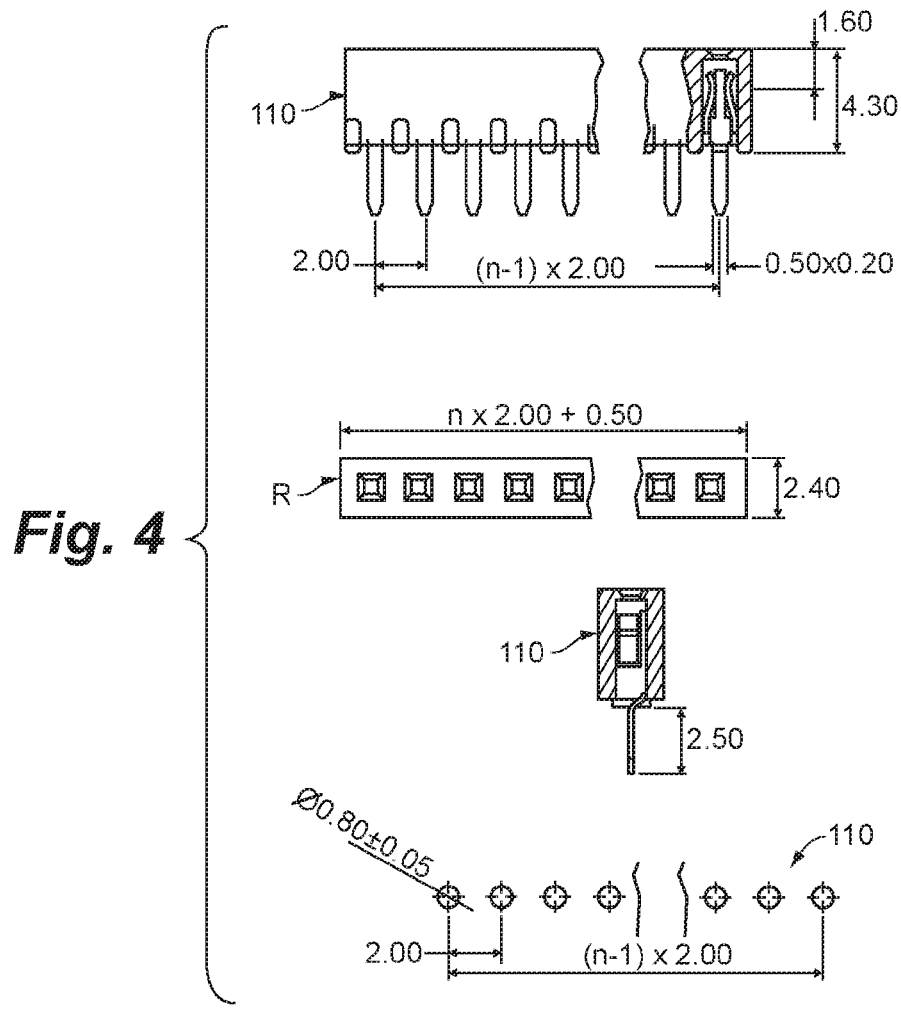
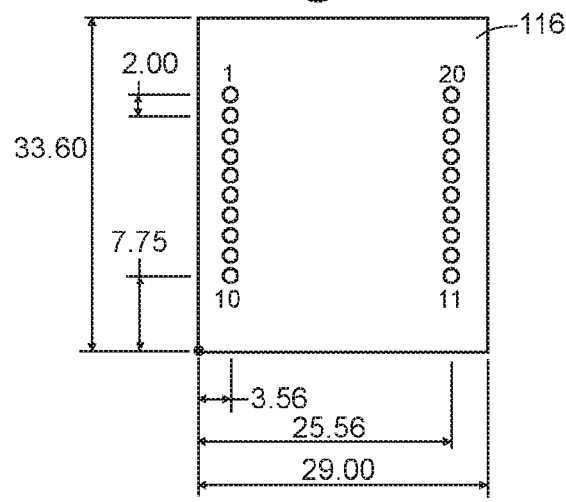

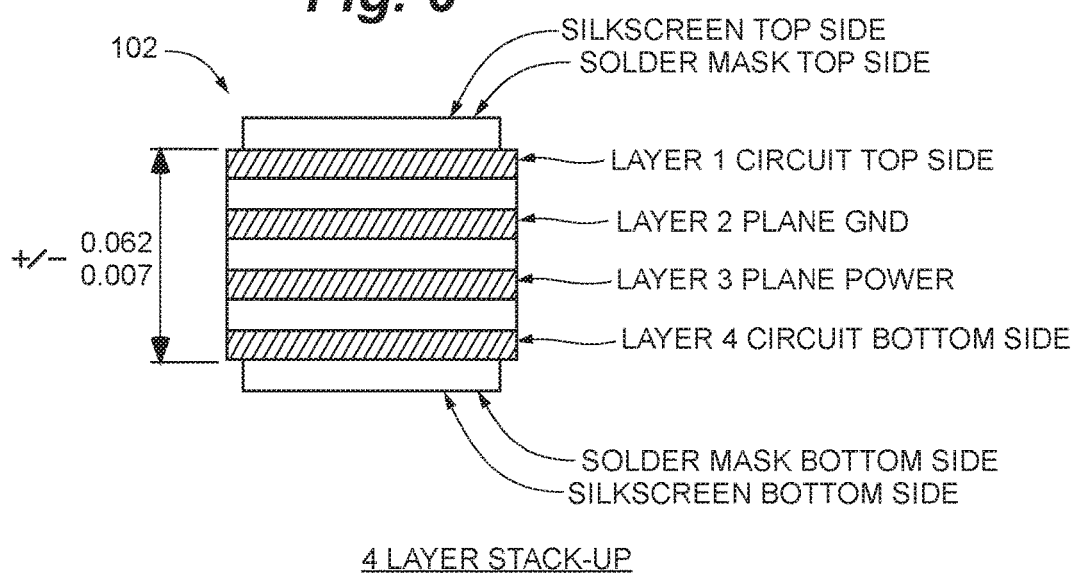

EMBEDDED WIRELESS MODEM

CROSS-REFERENCE TO RELATED APPLICATIONS

The present application is a continuation of U.S. patent application Ser. No. 14/616,118, filed Feb. 6, 2015, which claims the benefit of U.S. Provisional Application No. 61/936,651 filed Feb. 6, 2014, both of which are hereby incorporated by reference herein in their entireties.

FIELD OF THE INVENTION

The present invention is generally directed to embedded wireless modems. More specifically, the present invention is directed to improved, space-efficient embedded cellular modems for machine-to-machine communication.

BACKGROUND OF THE INVENTION

Wireless modems, and in particular, cellular modems, may be embedded in remotely-located machines such as meters, automatic teller machines (ATMs), temperature monitors, and so on, to enable wireless communication between the remotely-located "machine" and another "machine", such as a computer server. Such machine-to-machine (M2M) communications facilitate remote monitoring of devices, including data collection, in a number of applications and industries, including agriculture, security, oil and gas, property management, and so on.

While the use of embedded cellular modems in such M2M applications is generally known, presently-used modems remain relatively expensive, typically require a large footprint and may not be designed to be integrated with the latest standards of technology.

SUMMARY OF THE INVENTION

Embodiments of the invention comprise various space-efficient, embedded cellular modems for use in M2M applications. In an embodiment, cellular modems of the invention include a cellular transceiver module, U.FL antenna port, power management electronics, level shifter electronics, and an interface, all in an XBee® form factor. The embedded cellular modem may be configured to operate on a CDMA, GSM, or other cellular network.

Embedded cellular modems of the invention add robust cellular connectivity to M2M devices, and in the case of pre-certified modems, avoid the cost, delay and hassle of obtaining federal and carrier certifications. In an embodiment, modems of the invention comply with the XBee interface standard, optimized for 1xRTT, or other cellular networks, thereby minimizing costs of hardware and network access.

Other embodiments of the invention include embedded cellular modem kits which include an embedded cellular modem, baseboard, antenna, communications cable, and power supply.

An embodiment comprises a space-efficient cellular modem device for machine-to-machine communications that includes: a multi-layer printed circuit board defining a top side and a bottom side and including a first circuit layer adjacent the top side, a second circuit layer adjacent the bottom side, a ground plane layer, and a power plane layer, the ground and power plane layers located between the first and second circuit layers; a cellular transceiver module configured to communicate over a cellular wireless cellular network, the cellular transceiver module comprising a processor and attached to a top side of the multi-layer printed circuit board; electrical power-management components attached to the multi-layer printed circuit board, the power-management components in electrical communication with the cellular transceiver module; a first plurality of electrically-conductive pins in electrical connection with the cellular transceiver module and aligned along a first pin axis to form a first row of pins, each of the first plurality of pins extending outwardly and away from the bottom side of the multi-layer printed circuit board; a second plurality of electrically-conductive pins in electrical connection with the cellular transceiver module and aligned along a second pin axis to form a second row of pins, each of the second plurality of pins extending outwardly and away from the bottom side of the multi-layer printed circuit board a communications port, the second row of pins located opposite the first row of pins; and a communications port in electrical communication with the cellular transceiver module, the communications port configured to receive and transmit communication signals over the cellular wireless network.

Another embodiment comprises a space-efficient cellular modem device for machine-to-machine communications that includes: a multi-layer printed circuit board defining a top side and a bottom side and including a circuit layer, a ground plane layer and a power plane layer, the top side of the multi-layer printed circuit board defining a top-side surface area; a cellular transceiver module configured to communicate over a cellular wireless cellular network, the cellular transceiver module comprising a housing defining a top-side surface area and attached to a top side of the multi-layer printed circuit board, the top-side surface area of the cellular transceiver module being in a range of 50% to 100% of the top-side surface area of the multi-layer printed circuit board; electrical power-management components attached to the multi-layer printed circuit board, the power-management components in electrical communication with the cellular transceiver module; a first row of electrically-conductive pins in electrical connection with the cellular transceiver module, each of the pins extending outwardly and away from the bottom side of the multi-layer printed circuit board; a second row of electrically-conductive pins in electrical connection with the cellular transceiver module, each of the pins extending outwardly and away from the bottom side of the multi-layer printed circuit board; an antenna port in electrical communication with the cellular transceiver module, the communications port configured to receive and transmit communication signals over the cellular wireless network.

BRIEF DESCRIPTION OF THE FIGURES

The invention can be understood in consideration of the following detailed description of various embodiments of the invention in connection with the accompanying drawings, in which:

FIG. 1 depicts an embodiment of an embedded cellular modem, according to an embodiment of the invention;

FIG. 2 depicts a block diagram of the embedded cellular modem of FIG. 1;

FIG. 4 depicts pin connectors and receiver of the embedded cellular modem of FIG. 1;

FIG. 5 depicts a base board compatible with the embedded cellular modem of FIG. 1;

FIG. 6 depicts a multi-layer PC board assembly of the embedded cellular modem of FIG. 1;

Figure 3A:
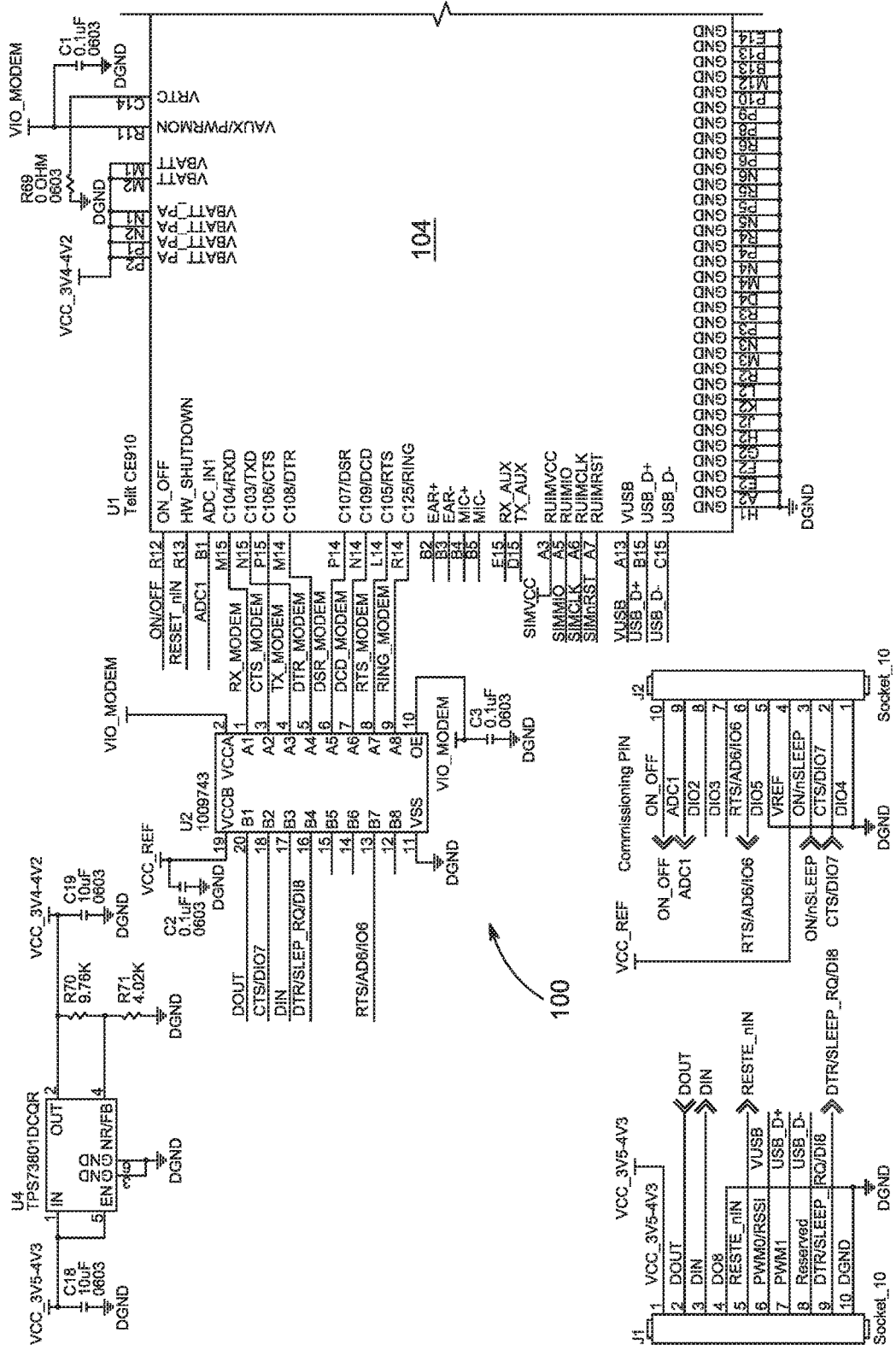
FIGS. 3a and 3b depict a circuit diagram of the embedded cellular modem of FIGS. 1 and 2.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIGS. 1-3*b*, an embodiment of an embedded cellular modem 100 is depicted. In an embodiment, cellular modem 100 includes printed-circuit (PC) board 102, cellular transceiver module 104, communication port 106, which may comprise an antenna port 106, power management and level shifter electronics 108, pin connectors 110 and interface 112.

As will be described further below, in an embodiment, PC board 102 may comprise a multi-layer board having multiple sub-boards electrically connected by inter-board vias.

In an embodiment cellular transceiver module 104 comprises a cellular transceiver configured to communicate over a cellular network, such as a CDMA network, including 1×RTT and EVDO networks, GSM networks, including GPRS, UMTS, HSPA+ and other cellular networks. In other embodiments, module 104 may communicate non-cellular RF networks.

In a specific embodiment, cellular transceiver module 104 comprises a Telit CE910-Dual 1×RTT communications module; in other embodiments, cellular transceiver module 104 comprises a Telit DE 910 Dual module, GE910 Quad, and LE 910 for CDMA EV-DO networks, GSM networks, and LTE networks, respectively. In an embodiment, cellular transceiver module 104 comprises a processor.

In an embodiment, antenna port 106 may comprise a U.FL antenna port configured to interface with a micro antenna cable. Although a single antenna port is depicted in FIG. 1, additional antenna ports 106 may be present, as described further below. In an embodiment, antenna port 106 may comprise an antenna port other than a U.FL antenna port. The use of micro-coaxial cables and antenna ports facilitates universal antenna options off-the-module.

Figure 3B:
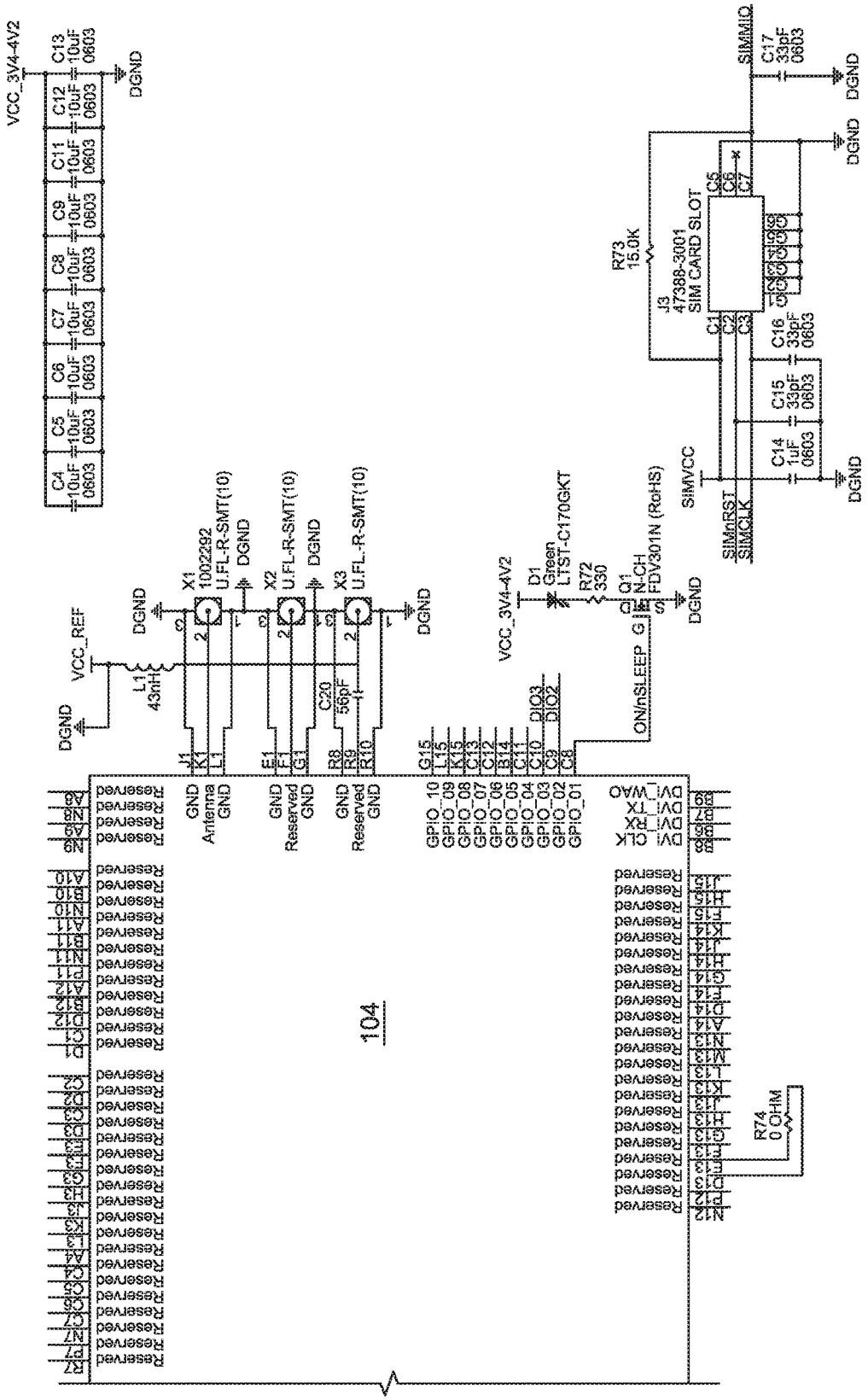

Power management and level shifter electronics 108 are located on PC board 102 and are described in further detail in FIGS. 3*a* and 3*b*, an electrical schematic of embedded cellular modem 100.

Embodiments of embedded cellular modem 100 may be configured for use in CDMA 1×RTT.

Referring also to FIG. 4, pin connectors 110, as depicted, may comprise two 10-pin connectors, 110*a* and 110*b*, having a 2 mm pitch, so as to comprise an XBee form factor. The ten pin connectors are configured to fit into corresponding female receptacles, such as receptacles R, depicted. In an embodiment, and as depicted, pin connectors 110 may comprise surface mount pins.

Referring also to FIG. 5, pin connectors 110 may be electrically connected, such as by soldering, to base PC board 116. In an embodiment, PC board 116 defines an envelope dimension of 33.60 mm×29.00 mm, with pin connections distributed about PC board 102 as depicted.

Referring to FIG. 6, the compact, space-efficient embedded cellular modem 100 achieves the XBee form factor by utilizing a multi-layer PC board. In an embodiment, PC board 102 comprises a multi-layer PC board including a silkscreened and solder-masked top side, a first layer (Layer 1) comprising a circuit top side, a second layer (Layer 2) comprising a ground plane, a third layer (Layer 3) comprising a power plane, a fourth layer (Layer 4) comprising a circuit bottom side, and finally, a silkscreened/solder-masked bottom side.

In an embodiment, and as depicted, PC board 102 as assembled defines a height of only 0.062 in+/−0.007 in.

Such a multi-layer, or 4-layer in this embodiment, allows for efficient spacing of surface-mounted components, connectors, and interfaces for the XBee form factor.

Figure 7:
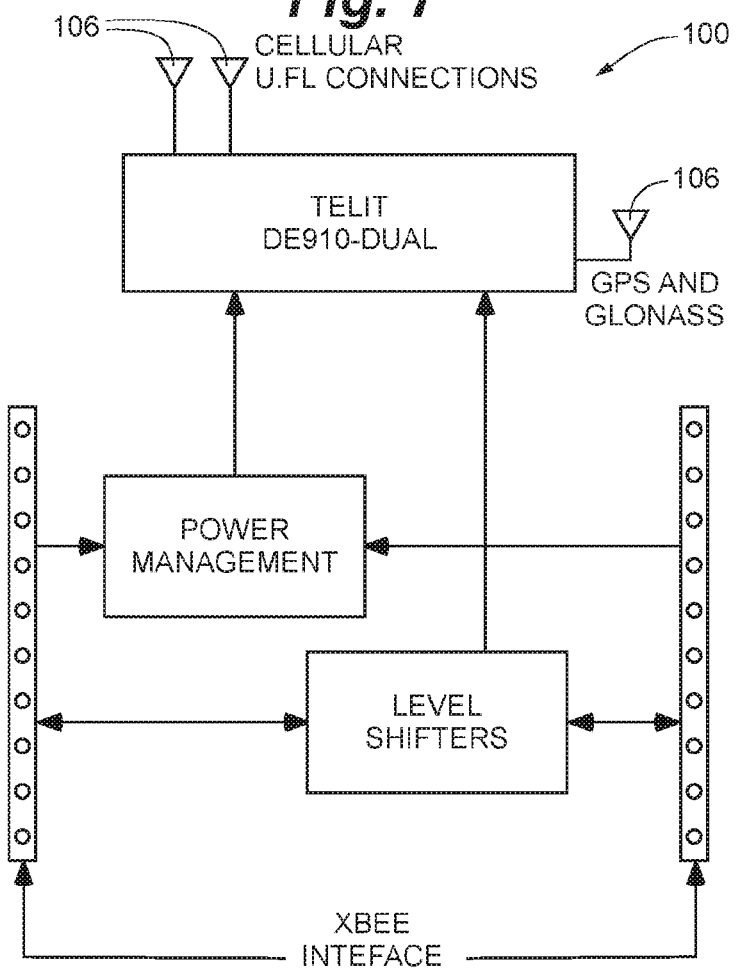
FIG. 7 depicts a CDMA EV-DO enabled embodiment of an embedded cellular modem, according to an embodiment of the invention.

Referring to FIG. 7, an embodiment of embedded cellular modem 100 configured to operate on a CDMA EV-DO network is depicted in a block diagram. In this embodiment, modem 100 includes a transceiver 104 that is configured for the EV-DO network, which in an embodiment comprises a Telit module DE910-DUAL. Further, this embodiment includes a pair of antenna ports 106. In an embodiment, three antenna ports 106, two of which are located at a top side of PC board 102, and one at a bottom side of PC board 102.

Figure 8:
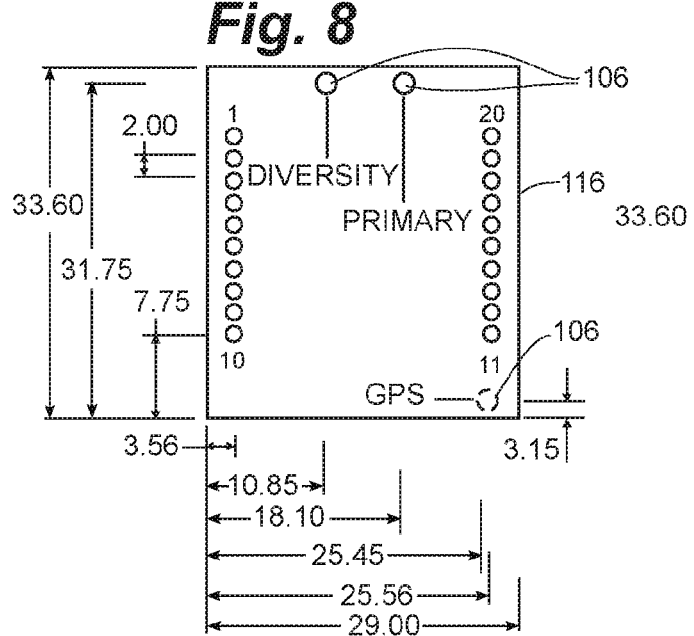
FIG. 8 depicts a PC board with connector locations of the embedded cellular modem of FIG. 7.

FIG. 8 is a mechanical drawing of PC board 102 of an EV-DO modem 100 showing locations of connectors. Such a drawing may be used to assist a designer in knowing where to align mating connectors on their baseboard as well as physical routing of RF cables inside their end product.

Figure 9:
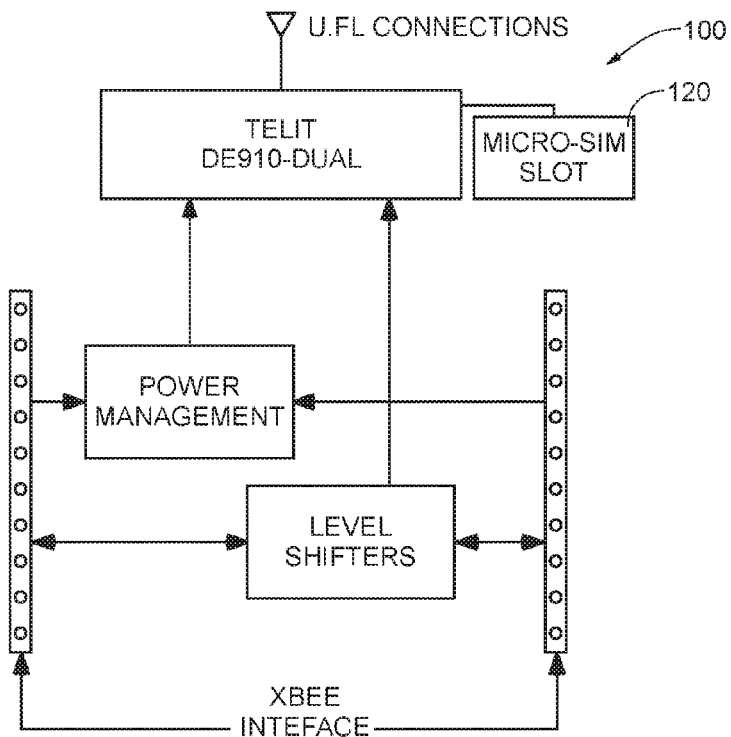
FIG. 9 depicts a GSM enabled embodiment of an embedded cellular modem, according to an embodiment of the invention.

Referring to FIG. 9, an embodiment of embedded cellular modem 100 configured to operate on a GPRS network is depicted in a block diagram. In this particular embodiment, modem 100 includes a micro-SIM slot 120. In an embodiment, micro-SIM slot 120 may be on a bottom side of PC board 120.

Figure 10:
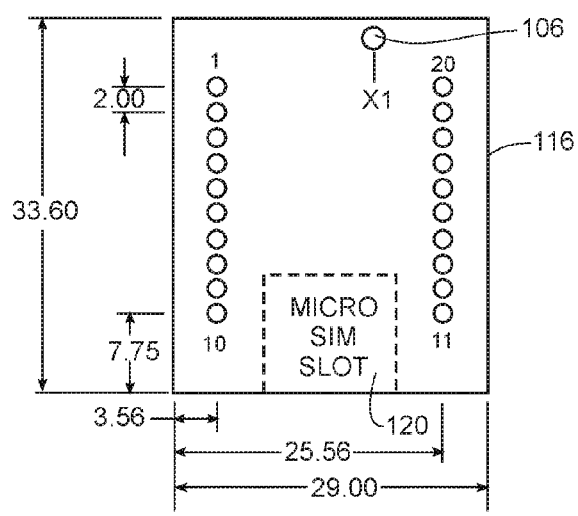
FIG. 10 depicts a PC board with connector locations of the embedded cellular modem of FIG. 9.
Figure 11A:
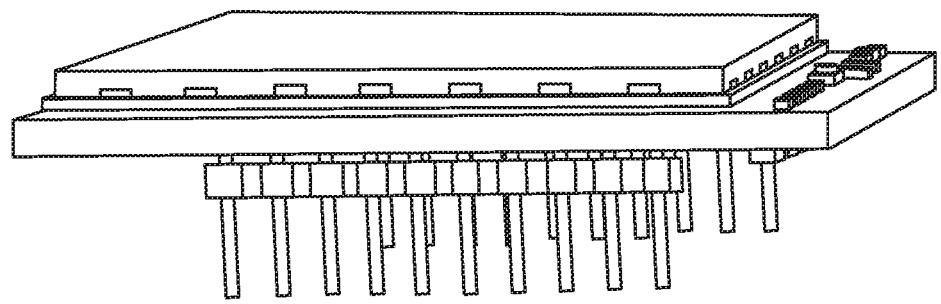
FIGS. 11*a*-11*g* depict various view of the embedded cellular modem of FIG. 1.
Figure 12A:
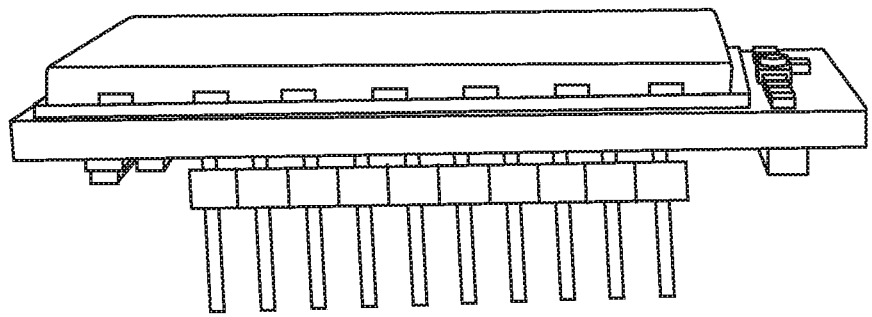
FIGS. 12*a*-*g* depict various views of the embedded cellular modem of FIG. 7.
Figure 13A:
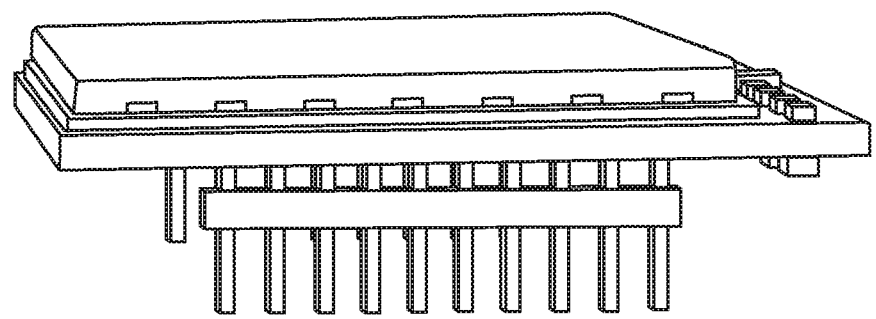
FIGS. 13*a*-*g* depict various views of the embedded cellular modem of FIG. 9.
Figure 11B:
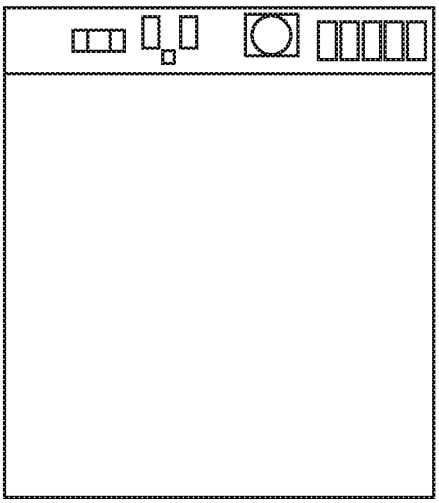
Figure 12B:
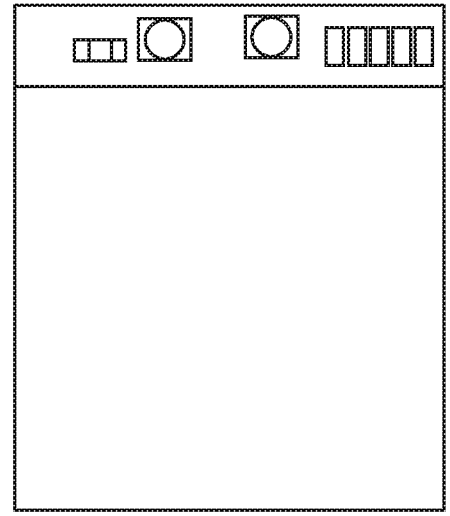
Figure 13B:
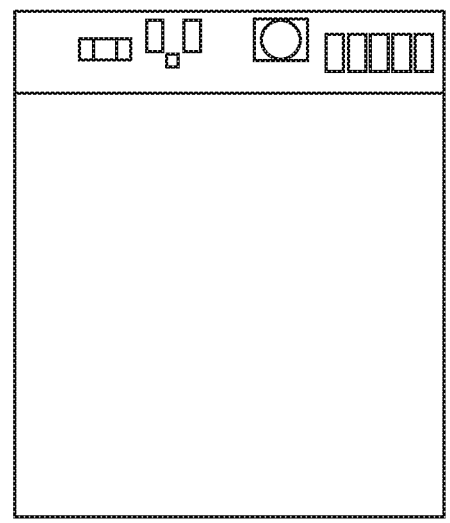
Figure 11C:
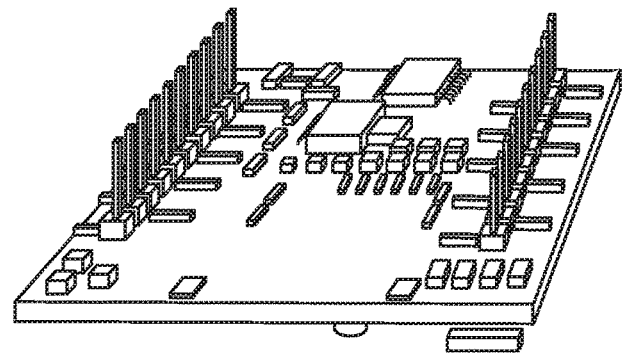
Figure 12C:
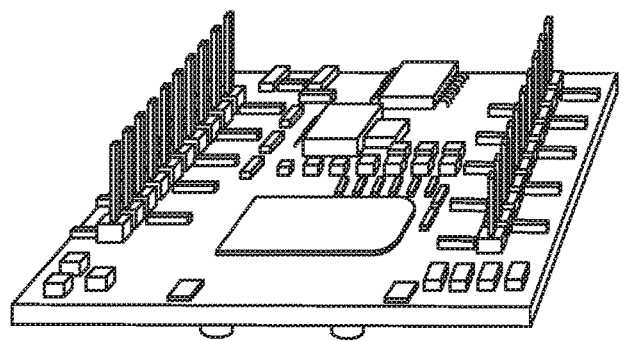
Figure 13C:
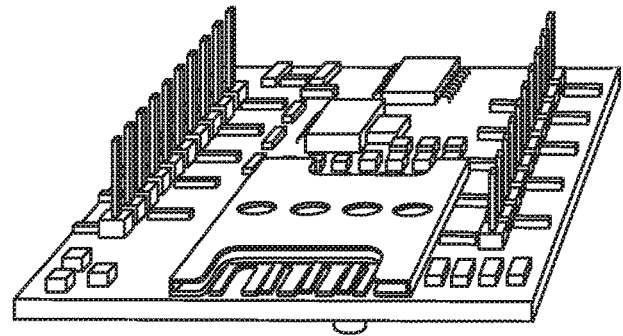
Figure 11D:
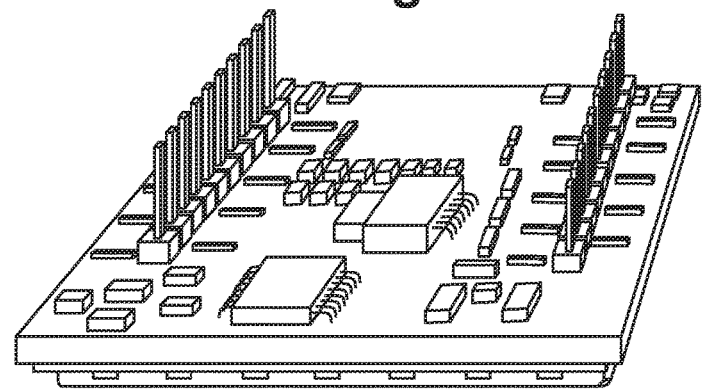
Figure 12D:
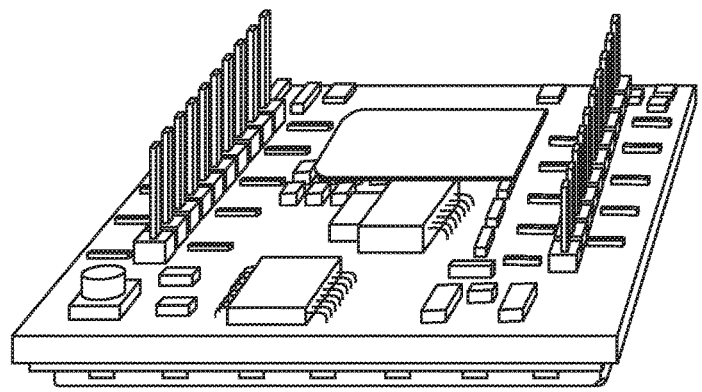
Figure 13D:
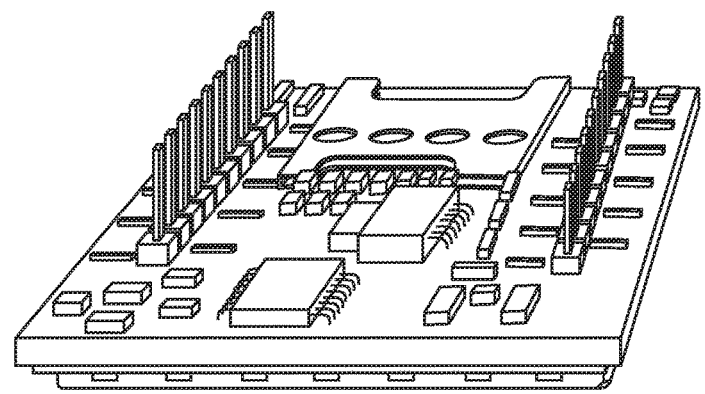
Figure 11E:
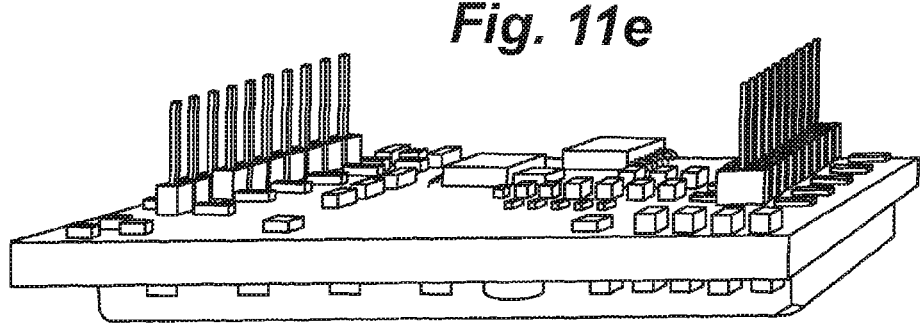
Figure 12E:
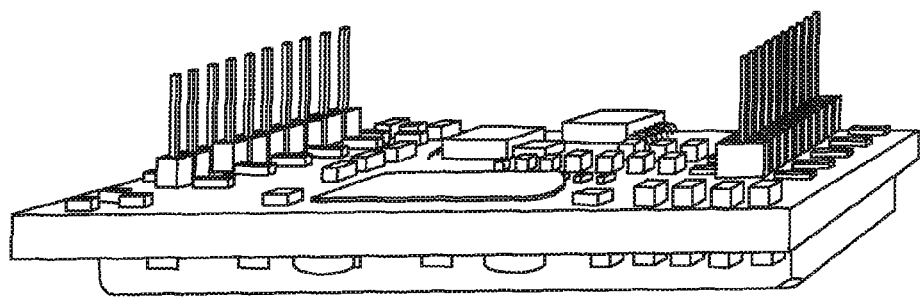
Figure 13E:
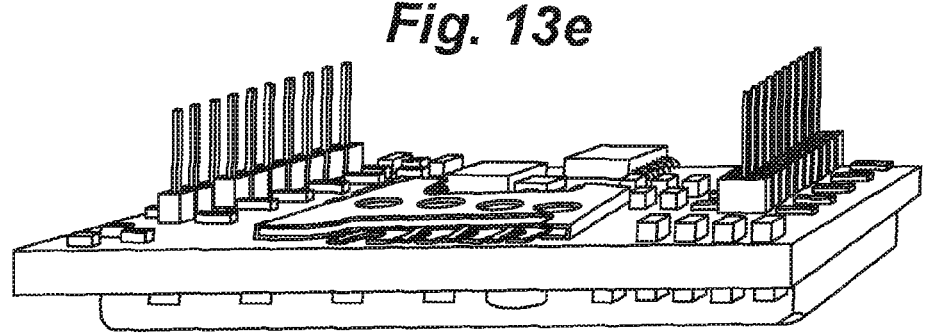
Figure 11F:
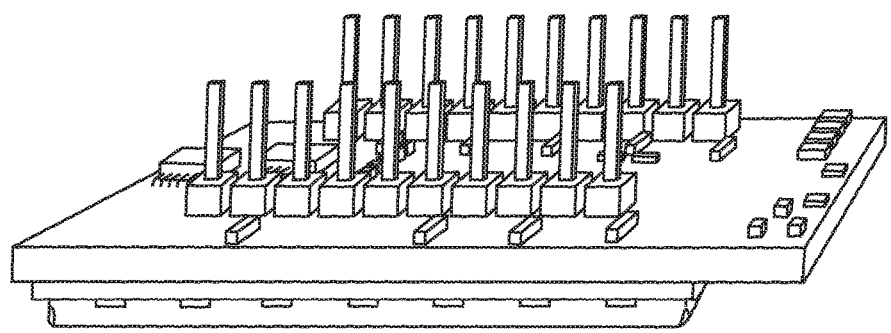
Figure 12F:
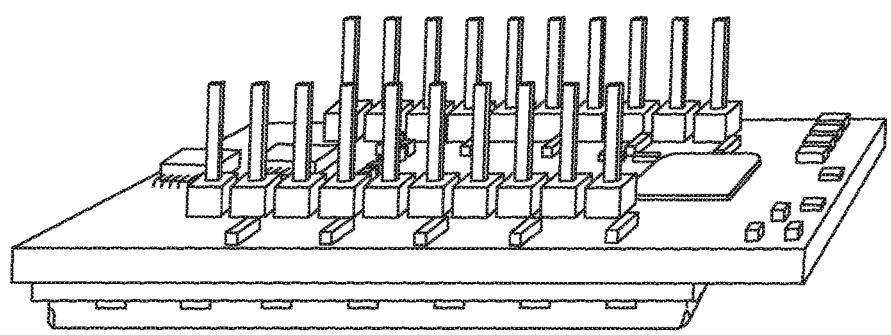
Figure 13F:
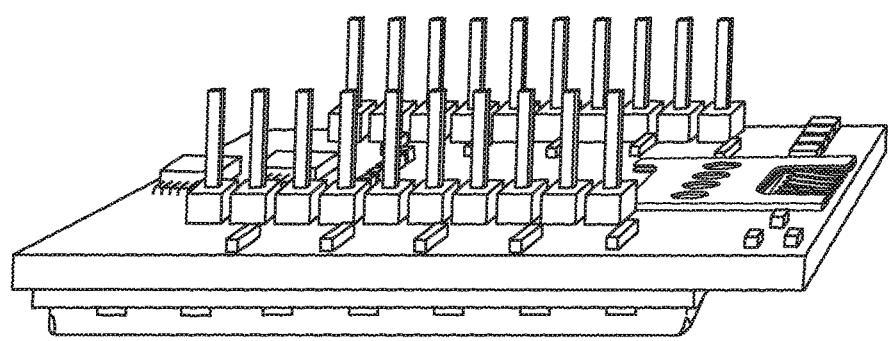
Figure 11G:
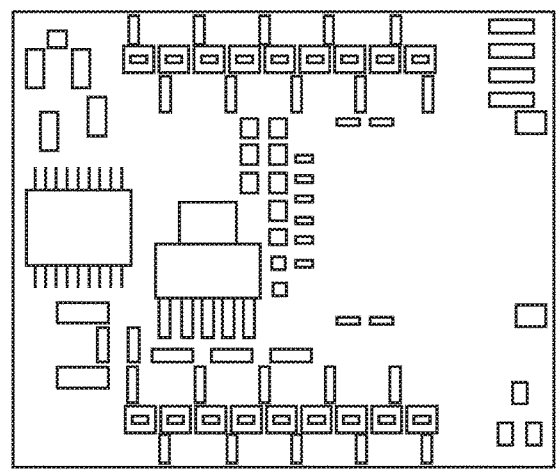
Figure 12G:
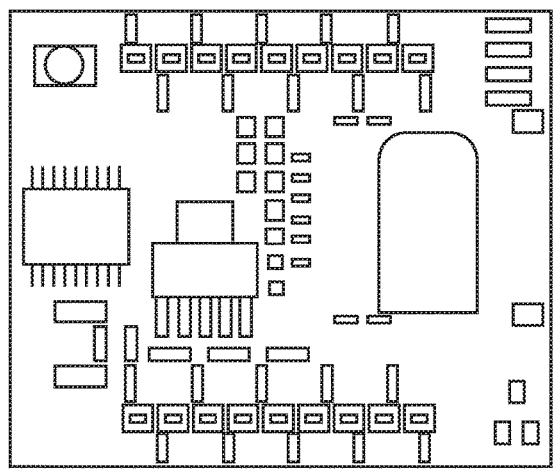
Figure 13G:
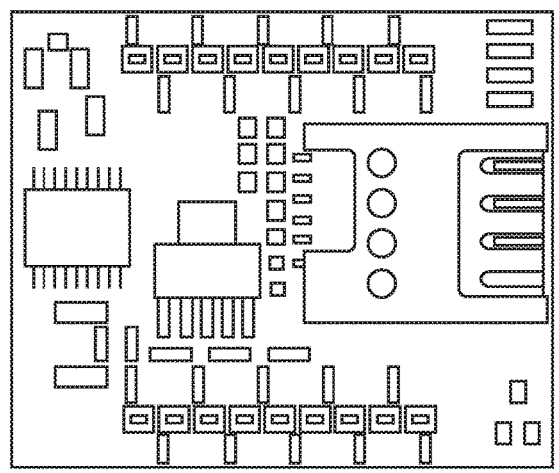

FIG. 10 is a mechanical drawing of PC board 102 of a GSM-GPRS modem 100 showing locations of connectors. Such a drawing may be used to assist a designer in knowing where to align mating connectors on their baseboard as well as physical routing of RF cables inside their end product.

Embodiments of embedded cellular modems configured for a CDMA network are depicted in FIGS. 11*a* to 11*g*; embodiments of embedded cellular modems configured for a CDMA EV-DO network are depicted in FIGS. 12*a* to 12*g*; and embodiments of embedded cellular modems configured for a GSM GPRS network are depicted in FIGS. 13*a* to 13*g*.

Embodiments of the invention may also comprise an LTE-capable modem 100.

As is evident from the above-described figures, embodiments of the invention provide a number of unique features and benefits. The space-efficient size of embedded cellular modem 100 is enabled by the use of surface mount connectors to meet XBee pinout requirements while freeing up surface area on a topside of the modem and its PC board. The use of solder-masked vias support high-volume manufacturing of small geometry board features under BGA components. Further, the use of a micro-SIM card slot on an XBee-sized board provides unique advantages over known modems.

PCB panel design using a combination of scored edges and routered edges supports low cost, high volume PCB manufacturing and subsequent module assembly. Further, the multi-layer stackup approach not only minimizes size and cost, but also maximizes RF performance, such as minimizing signal loss and improving RX sensitivity.

GPS and GLONASS positioning support in an XBee-sized board is also unique, as is the ability to support antenna diversity in an XBee form factor.

In addition to the advantages offered by embodiments of embedded cellular modem 100 as described above, embodiments of the invention also include a cellular modem kit.

Figure 14:
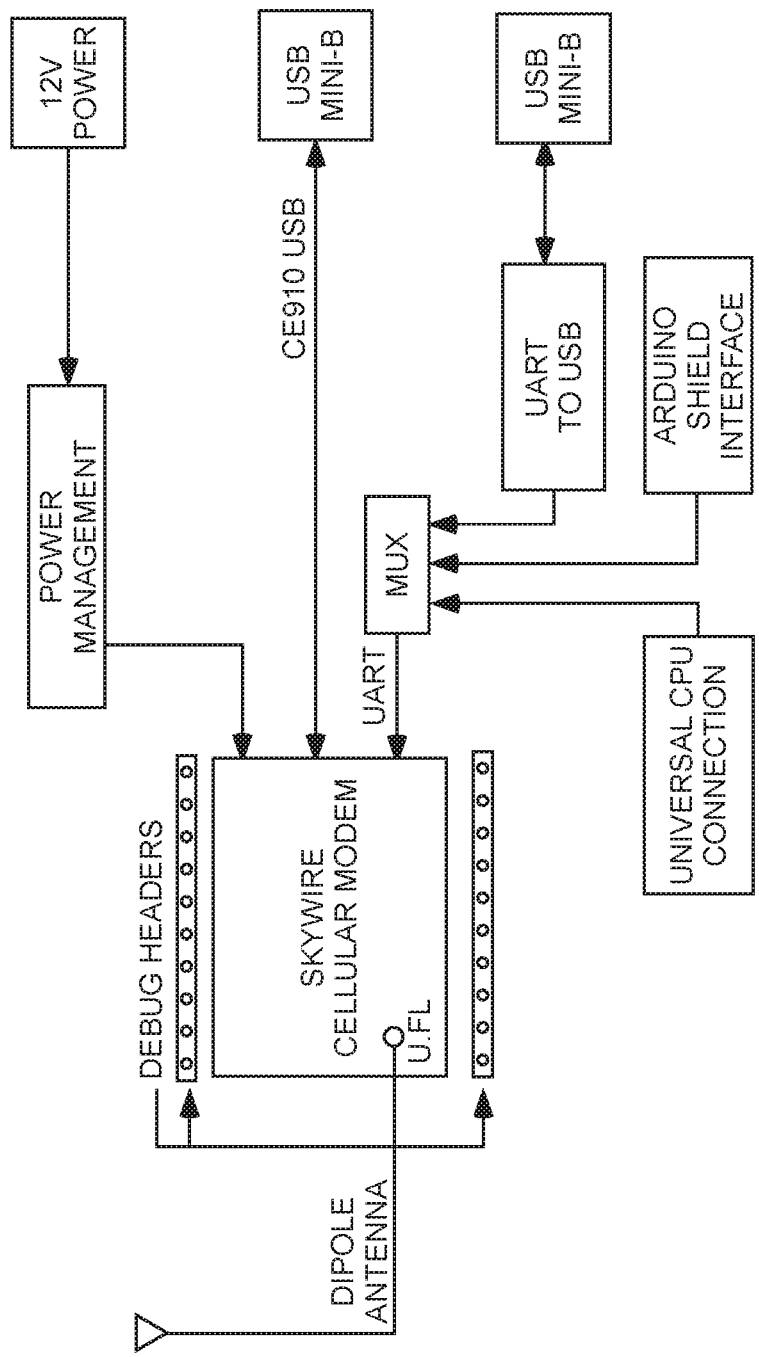
FIG. 14 depicts a development kit, according to an embodiment of the invention.
Figure 15:
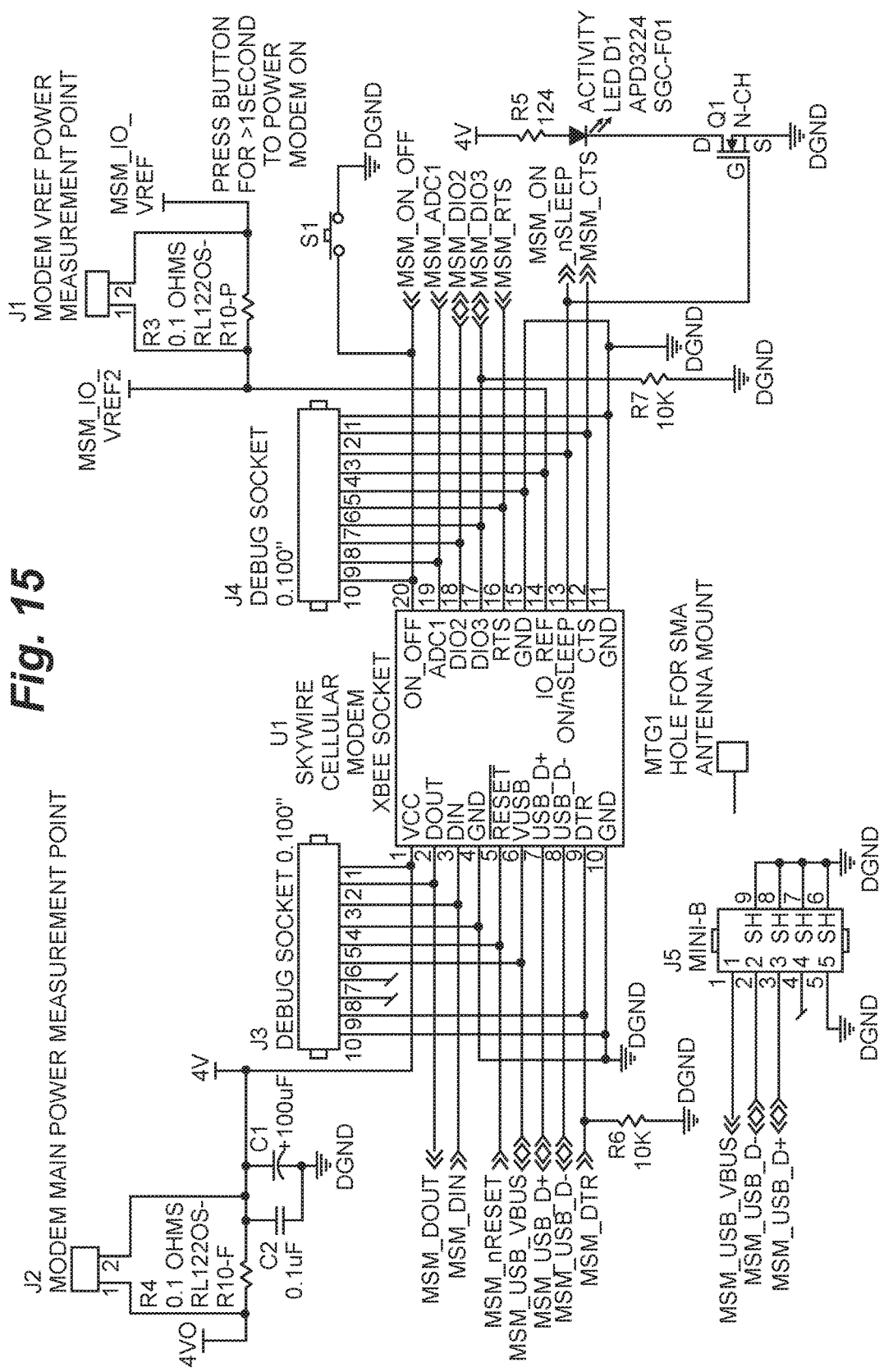
FIGS. 15-19 depict electrical schematics of the development kit of FIG. 14.
Figure 16:
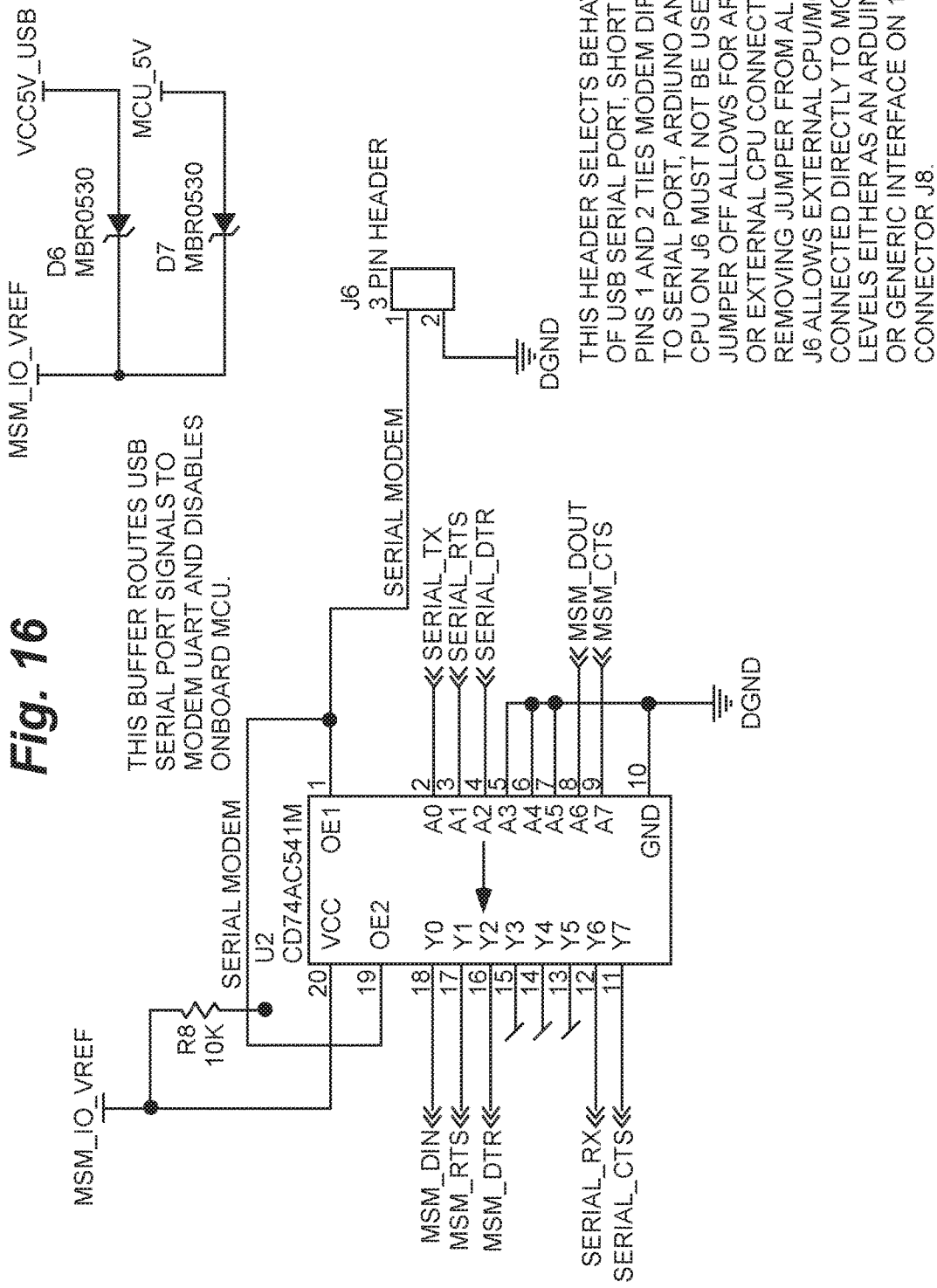
Figure 17:
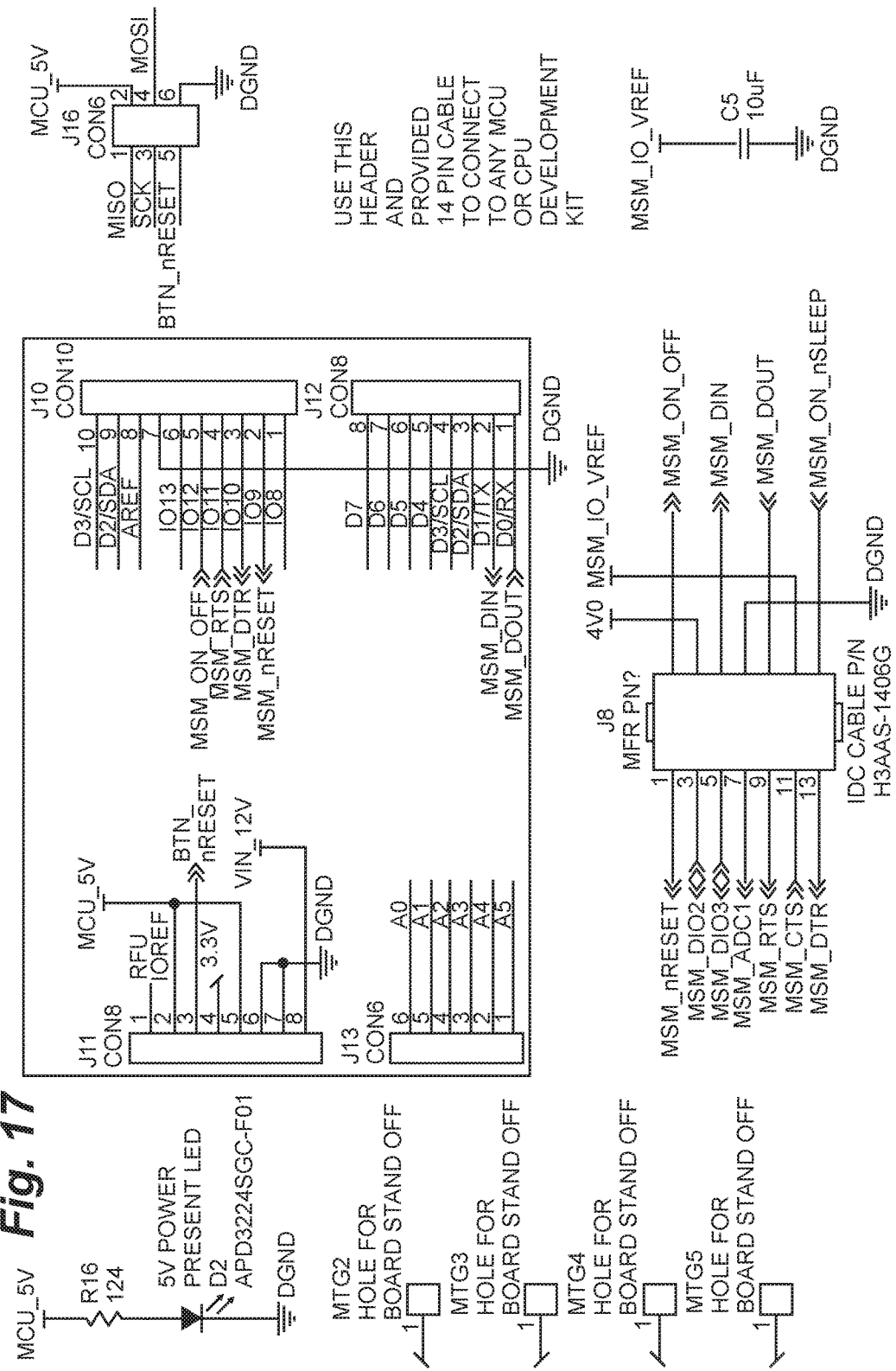
Figure 18:
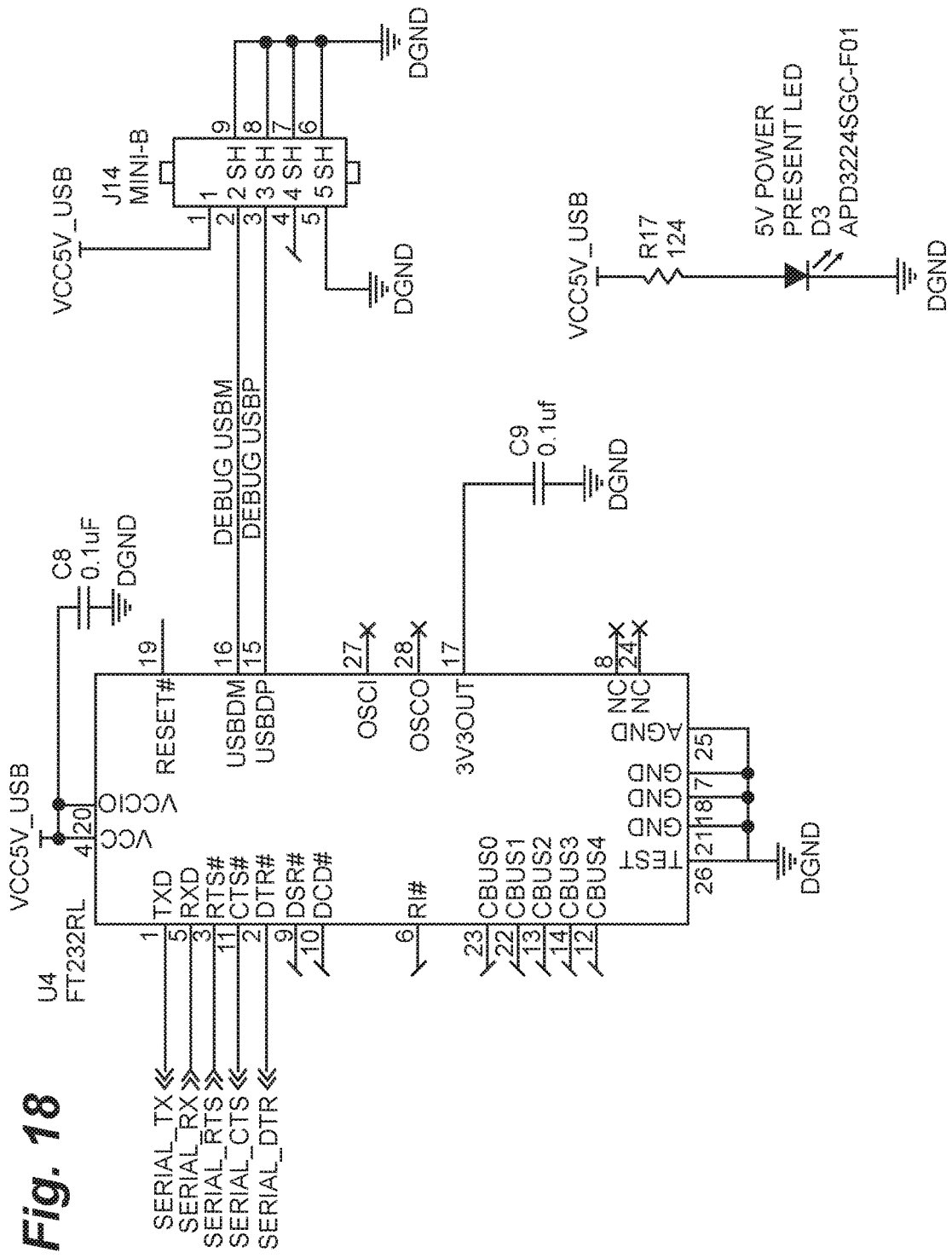
Figure 19:
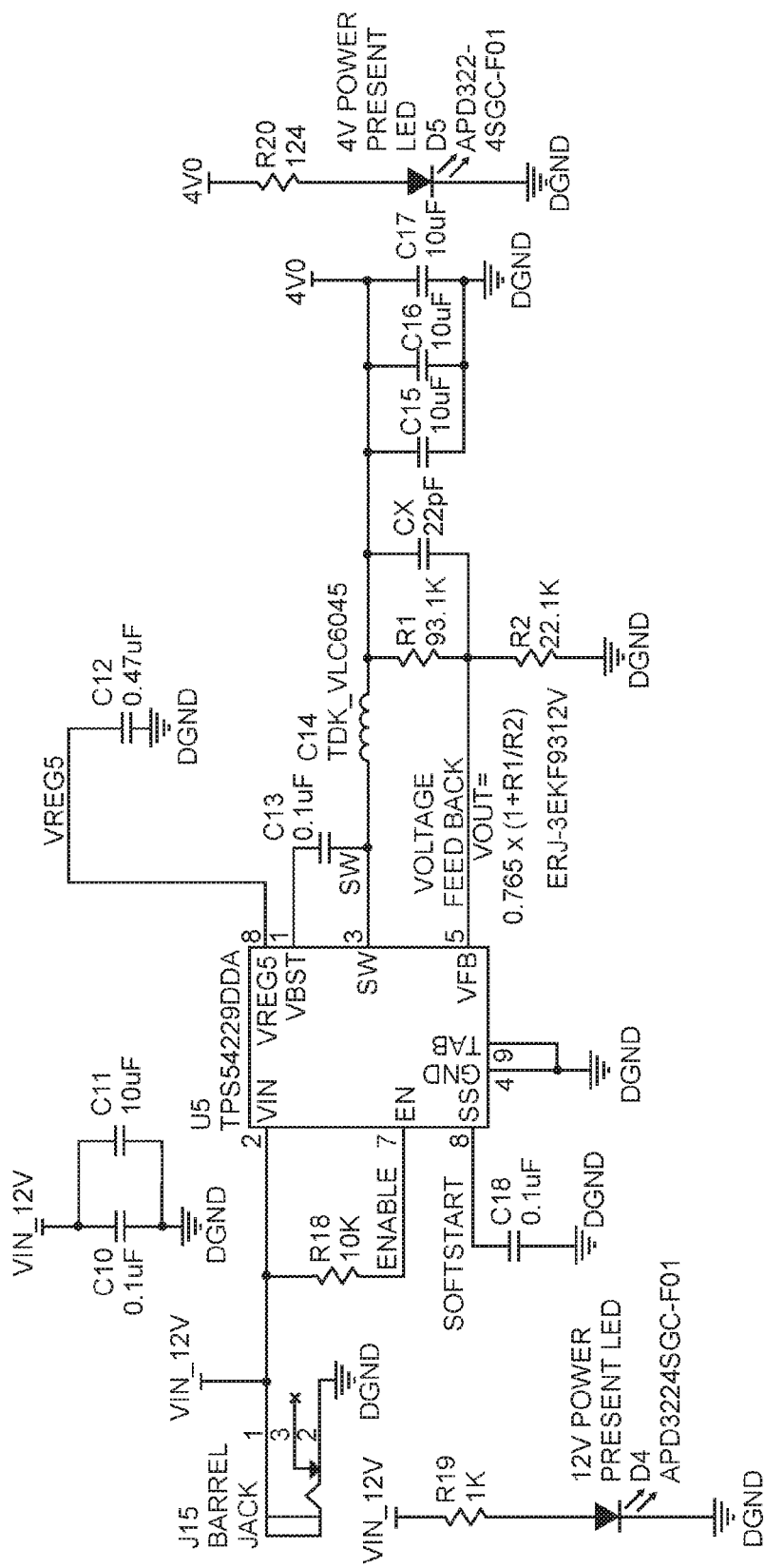

Referring to FIG. 14, a block diagram of an assembled development kit is depicted. In an embodiment, the kit includes cellular modem 100 with debugging headers, power management electronics supplied by a power source (depicted as a 12V source). Other components include a USB Mini-B connected to modem 100, another USB Mini-B interfacing with a MUX via a UART to USB interface, an universal CPU connection, and an Arduino Shield interface.

Details of the block diagram are further depicted and described in the schematic diagrams of FIGS. 15-19.

Embodiments of the invention also include algorithms for sending SMS messages using embedded cellular modem 100.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed:

1. A space-efficient cellular modem device for machine-to-machine communications, the modem device comprising:
   a multi-layer printed circuit board defining a first side and a second side and including at least four layers, the four layers including a first layer including one or more circuits, a second layer including a ground plane, a third layer including a power plane, and a fourth layer including one or more circuits, wherein the first layer is soldermasked to form the first side of the multi-layer printed circuit board, the second layer is between the first layer and the fourth layer, the third layer is between the first layer and the fourth layer, and the fourth layer is soldermasked to form the second side of the multi-layer printed circuit board;
   a cellular transceiver module configured to communicate over a cellular wireless network, the cellular transceiver module comprising a processor and attached to the first side of the multi-layer printed circuit board;
   electrical power-management components attached to the multi-layer printed circuit board, the power-management components in electrical communication with the cellular transceiver module;
   a first plurality of electrically-conductive pins aligned along a first pin axis to form a first row of pins, each of the first plurality of pins extending outwardly and away from the multi-layer printed circuit board, one or more of the first plurality of electrically-conductive pins in electrical connection with the cellular transceiver module and one or more of the first plurality of electrically-conductive pins in electrical connection with the electrical power-management components;
   a second plurality of electrically-conductive pins aligned along a second pin axis to form a second row of pins, each of the second plurality of pins extending outwardly and away from the multi-layer printed circuit board, the second row of pins located opposite the first row of pins; and
   a communications port in electrical communication with the cellular transceiver module, the communications port configured to receive and transmit communication signals over the cellular wireless network.

2. The space-efficient cellular modem device of claim 1, wherein the second layer is between the first layer and the third layer.

3. The space-efficient cellular modem device of claim 1, wherein each pin of the second plurality of electrically-conductive pins is opposite a pin of the first plurality of electrically-conductive pins.

4. The space-efficient cellular modem device of claim 1, wherein the pins of the first plurality of electrically-conductive pins are equidistantly spaced from one another, and the pins of the second plurality of electrically-conductive pins are equidistantly spaced from one another.

5. The space-efficient cellular modem device of claim 1, wherein the first plurality of electrically-conductive pins and the second plurality of electrically-conductive pins are surface-mounted pins.

6. The space-efficient cellular modem device of claim 1, wherein the first plurality of electrically-conductive pins and the second plurality of electrically-conductive pins extend from the second side of the multi-layer printed circuit board.

7. The cellular modem device of claim 1, wherein one or more of the first plurality of electrically-conductive pins is in electrical connection with the cellular transceiver module or is in electrical connection with the electrical power management components.

8. The cellular modem device of claim 1, wherein the cellular wireless network is an LTE network.

9. The cellular modem device of claim 1, wherein the communications port comprises an antenna port, and the cellular modem further comprises an antenna.

10. The cellular modem device of claim 1, wherein each of the first plurality of pins and the second plurality of pins consists of ten pins.

11. The cellular modem device of claim 1, wherein a length of the cellular modem device does not exceed 34 mm and a width of the cellular modem device does not exceed 29 mm.

12. The cellular modem device of claim 1, further comprising a SIM card slot.

13. A space-efficient cellular modem device for machine-to-machine communications, the modem device comprising:
 a multi-layer printed circuit board defining a first side and a second side and including at least four layers, the four layers including a first layer including one or more circuits, a second layer including a ground plane, a third layer including a power plane, and a fourth layer including one or more circuits, wherein the first layer is soldermasked to form the first side of the multi-layer printed circuit board, the second layer is between the first layer and the fourth layer, the third layer is between the first layer and the fourth layer, and the fourth layer is soldermasked to form the second side of the multi-layer printed circuit board;
 a cellular transceiver module configured to communicate over a cellular wireless cellular network, the cellular transceiver module comprising a housing defining a top-side surface area and attached to the first side of the multi-layer printed circuit board, the top-side surface area of the cellular transceiver module being in a range of 50% to 100% of a surface area of the first side of the multi-layer printed circuit board;
 electrical power-management components attached to the multi-layer printed circuit board, the power-management components in electrical communication with the cellular transceiver module;
 a first plurality of electrically-conductive pins aligned along a first pin axis to form a first row of pins, each of the first plurality of pins extending outwardly and away from the multi-layer printed circuit board, one or more of the first plurality of electrically-conductive pins in electrical connection with the cellular transceiver module and one or more of the first plurality of electrically-conductive pins in electrical connection with the electrical power-management components;
 a second plurality of electrically-conductive pins aligned along a second pin axis to form a second row of pins, each of the second plurality of pins extending outwardly and away from the multi-layer printed circuit board, the second row of pins located opposite the first row of pins; and
 an antenna port in electrical communication with the cellular transceiver module, the communications port configured to receive and transmit communication signals over the cellular wireless network.

14. The cellular modem device of claim 13, further comprising an antenna connected to the antenna port.

15. The cellular modem device of claim 13, wherein cellular wireless cellular network is an LTE network.

16. The cellular modem device of claim 13, further comprising a USB interface.

17. The cellular modem device of claim 13, wherein each of the first row of pins and the second row of pins consists of ten pins.

18. The cellular modem device of claim 13, wherein a length of the cellular modem device does not exceed 34 mm and a width of the cellular modem device does not exceed 29 mm.

19. The cellular modem device of claim 13, further comprising a SIM card slot.

20. The cellular modem device of claim 13, wherein a height of the multi-layer printed circuit board does not exceed 0.07 inches.

21. A space-efficient cellular modem device for machine-to-machine communications, the modem device comprising:
 a multi-layer printed circuit board defining a first side and a second side and including at least four layers, the four layers including a first layer including one or more circuits, a second layer including a planar grounding portion, a third layer including a planar power portion, and a fourth layer including one or more circuits, wherein the first layer is soldermasked to form the first side of the multi-layer printed circuit board, the second layer is between the first layer and the fourth layer, the third layer is between the first layer and the fourth layer, and the fourth layer is soldermasked to form the second side of the multi-layer printed circuit board;
 a cellular transceiver module attached to the first side of the multi-layer printed circuit board and configured to communicate over a cellular wireless cellular network, the cellular transceiver module comprising a processor, the processor configured to communicate with a subscriber identity module (SIM); and
 electrical power-management components attached to the multi-layer printed circuit board, the power-management components in electrical communication with the cellular transceiver module;
 a first plurality of electrically-conductive portions aligned along a first axis to form a first row of electrically conductive portions, one or more of the first plurality of electrically-conductive portions in electrical connection with the cellular transceiver module and one or more of the first plurality of electrically-conductive portions in electrical connection with the electrical power-management components;
 a second plurality of electrically-conductive portions aligned along a second axis to form a second row of electrically-conductive portions, the first axis being parallel to the second axis, and the second row of electrically-conductive portions located opposite the first row of electrically-conductive portions; and
 a communications port in electrical communication with the cellular transceiver module, the communications port configured to receive and transmit communication signals over the cellular wireless network.

22. The space-efficient cellular modem device of claim 21, wherein the second layer is between the first layer and the third layer.

23. The space-efficient cellular modem device of claim 21, wherein the first plurality of electrically-conductive portions comprises ten pins, and the second plurality of electrically-conductive portions comprises ten pins, and each of the pins of the first plurality of electrically-conductive portions are equidistantly spaced from one another, and each of the pins of the second plurality of electrically-conductive pins are equidistantly spaced from one another.

24. The space-efficient cellular modem device of claim 23, wherein the pins of the first plurality of electrically conductive portions and the pins of the second plurality of electrically conductive portions are surface-mounted pins.

25. The cellular modem device of claim 21, wherein the cellular wireless network is an LTE network.

26. The cellular modem device of claim 21, wherein the communications port comprises an antenna port, and the cellular modem further comprises an antenna.

27. The cellular modem device of claim 21, wherein a length of the cellular modem device does not exceed 34 mm and a width of the cellular modem device does not exceed 29 mm.

28. The cellular modem device of claim 21, further comprising a SIM card slot for receiving the SIM.

29. The cellular modem device of claim 21, further comprising a USB interface.

* * * * *